US012646122B2

(12) United States Patent 
Song et al.

(10) Patent No.: US 12,646,122 B2 
(45) Date of Patent: Jun. 2, 2026

(54) FINGERPRINTING AND MACHINE LEARNING FOR PRODUCTION PREDICTIONS

(71) Applicant: CONOCOPHILLIPS COMPANY, Houston, TX (US)

(72) Inventors: Yishu Song, Houston, TX (US); Gerald E. Michael, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 260 days.

(21) Appl. No.: 17/831,488

(22) Filed: Jun. 3, 2022

(65) Prior Publication Data

US 2022/0391998 A1 Dec. 8, 2022

Related U.S. Application Data

(60) Provisional application No. 63/196,639, filed on Jun. 3, 2021.

(51) Int. Cl.
*G06Q 50/02* (2024.01)
*G06N 3/08* (2023.01)
*G06N 20/10* (2019.01)

(52) U.S. Cl.
CPC .............. *G06Q 50/02* (2013.01); *G06N 3/08* (2013.01); *G06N 20/10* (2019.01)

(58) Field of Classification Search
CPC ........... G06Q 50/02; G06N 20/10; G06N 3/08
See application file for complete search history.

(56) References Cited

U.S. PATENT DOCUMENTS

| | | | |
|---|---|---|---|
| 8,360,143 B2 | 1/2013 | Ziauddin et al. | |
| 8,781,747 B2 | 7/2014 | Ziauddin | |
| 8,818,736 B2 | 8/2014 | Nouvelle | |
| 9,074,465 B2 | 7/2015 | Abivin et al. | |
| 11,002,722 B2 | 5/2021 | Michael et al. | |
| 2018/0313807 A1* | 11/2018 | Michael | ............... E21B 43/30 |
| 2022/0025753 A1* | 1/2022 | Heidari | ............... E21B 49/005 |
| 2022/0253726 A1* | 8/2022 | Anifowose | ........... G06N 20/00 |
| 2022/0374571 A1* | 11/2022 | Kayode | ............... E21B 49/087 |
| 2024/0003235 A1* | 1/2024 | Bruns | .................. G01V 1/282 |

FOREIGN PATENT DOCUMENTS

| | | | |
|---|---|---|---|
| CN | 109807544 B | * | 4/2020 |
| CN | 113027429 A | * | 6/2021 |

OTHER PUBLICATIONS

Jason Brownlee, "Train-Test Split for Evaluating Machine Learning Algorithms" Aug. 26, 2020, Python Machine Learning, https://machinelearningmastery.com/train-test-split-for-evaluating-machine-learning-algorithms/, accessed Jul. 18, 2024, pp. 1-2. (Year: 2024).*
"Train-Test Split for Evaluating Machine Learning Algorithms" (Brownlee), pp. 1 and 2, Machine Learning Mastery, Making Developers Awesome at Machine Learning (Year: 2020).*

(Continued)

*Primary Examiner* — Michael J Dalbo
*Assistant Examiner* — Kaleria Knox
(74) *Attorney, Agent, or Firm* — Boulware & Valoir PLLC

(57) ABSTRACT

A method of predicting production characteristics of a hydrocarbon well using time lapse geochemistry fingerprinting and using machine learning to train a reservoir model to accurately predict production characteristics.

10 Claims, 16 Drawing Sheets

(56)　　　　　References Cited

OTHER PUBLICATIONS

Abutaqiya, M. I. L.; Panuganti, S. R.; Vargas, F. M. 'Efficient algorithm for the prediction of pressure-volume-temperature properties of crude oils using the perturbed-chain statistical association fluid theory equation of state.' Ind. Eng. Chem. Res. (2017) 56, 20, 6088-6102.

Azad, A.; Somanchi, K.; Brewer, J. R.; Yang, D. 'Accelerating completions concept select in unconventional plays using diagnostics and frac modeling.' Paper presented at the SPE Hydraulic Fracturing Technology Conference and Exhibition, The Woodlands, TX (2017) SPE-184867-MS.

Baskin D. K.; Kornacki, A.; Mccaffery, M.; 'Allocating the contribution of oil from the Eagle Ford Formation, the Buda Formation, and Austin Chalk to Commingled production from horizontal wells in South Texas using geochemical fingerprinting technology.' Paper Presented at the AAPG Annual Convention and Exhibition, Pittsburgh, PA (2014) Article #41268.

Benamara C.; Amar, M. N.; Gharbi, K.; Hamada, B. 'Modeling wax disappearance temperature using advanced Intelligent frameworks.' Energy & Fuels (2019) 33, 11, 10959-10968.

Bennett B.; Adams, J. J.; Larter, S. R.; 'Oil fingerprinting for production allocation: exploiting the natural variations in fluid properties encountered in heavy oil and oil sand reservoirs.' AAPG Search and Discovery Article (2009) Article #90163.

Bowen, G. J.; Wilkinson, B. 'Spatial distribution of D 18 0 in meteoric precipitation.' Geology (2002), 30(4), 315-318.

Cander, H. 'Sweet spots in shale gas and liquids plays: prediction of fluid composition and reservoir pressure.' Paper presented at AAPG Annual Convention and Exhibition, Long Beach, CA (2012).

Capo, R.C.; Stewart, B.; Rowan, E.; Kohl, C.; Wall, A.; Chapman, E.; Hammack, R.; Schroeder, K. The strontium isotope evolution of Marcellus Formation produced waters, southwestern Pennsylvania. Int. Jour. of Coal Geology, (2014) 126, 57-63.

Chapman, E.C.; Capo, R. C.; Stewart, B. W.; Kirby, C. S.; Hammack, R. W.; Schroeder, K. T.; Edenborn, H. M. 'Geochemical and strontium isotope characterization of produced waters from Marcellus Shale natural gas extraction.' Environmental Science and Technology (2012) 46, 3545-3553.

Cipolla, C. 'How do we optimize hydraulic fracturing in shale resource plays? Learning from the past and predicting the future.' Paper presented at the SPE Hydraulic Fracturing Technology Conference and Exhibition, The Woodlands, TX (2015) SPE-176014-PT.

Cipolla, C.; Maxwell S.; Mack, M. 'Engineering guide to the application of Microseismic interpretations.' Paper presented at the SPE Hydrawulic Fracturing Technology Conference and Exhibition, The Woodlands, TX (2012) SPE-152165-MS.

Ebongue V. W.; Jendrzejewski, N.; Walgenwitz, F.; Pineau, F.; Javoy, M. 'Chlorine isotope residual salt analysis: A new tool to investigate formation waters from core analyses.' AAPG Bull. (2005) 89(8): 1005-1018.

England, W.A. 'Empirical correlations to predict gas/gas condensate phase behavior in sedimentary basins.' Org. Geochemistry (2002) 33(6), 665-673.

Freeman, C. M.; Moridis, G. J.; Michael, G. E.; Blasingame, T. A. 'Measurement, modeling, and diagnostics of flowing gas composition changes in shale gas wells.' Paper presented at the SPE Latin America and Carinnean Petroleum Engineering Conference, Mexico City, Mexico (2012) SPE-153391-MS.

Frost, C. D.; Toner, R. N. 'Strontium isotopic identification of water-rock interaction and ground water mixing.' Ground Water (2004) 42(3) 418-432.

Hall, C.; Rauch, B.; Bauder, U.; Clercq, P. L.; Aignwe, M. 'Predictive capability assessment of probabilistic machine leaning models for density prediction of conventional and synthetic Jet Fuels.' Energy Fuels (2021) 35(3), 2520-2530.

Jones S. R. 'Producing-gas/oil ratio behavior of multifractured horizontal wells in tight oil reservoirs.' SPE Res Eval & Eng (2016) 20 (03): 589-601, Paper No. SPE-184397-PA.

Jweda J.; Long, H.; Michael, E. 'Machine learning assisted production allocation using a 3-D full field geochemical model of produced oils in the Eagle Ford and Austin Chalk of South Texas.' Paper presented at the SPE/AAPG/SEG Unconventional Resources Technology Conference, Houston, TX (2021) Paper No. URTEC-2021-5117-MS.

Jweda, J.; Michael, E; Jokanola, O. A.; Hofer, R.; Parisi, V. A. 'Optimizing field development strategy using time-lapse geochemistry and production allocation in Eagle Ford.' Paper presented at the SPE/AAPG/SEG Unconventional Resources Technology Conference, Austin, TX (2017) Paper No. URTEC-2671245-MS.

Katritzky, A. R.; Kuanar, M.; Slavov, S.; Hall, C. D.; Karelson, M.; Kahn, I; Dobchev, D. A. 'Quantitative correlation of physical and chemical properties with chemical structure: utility for prediction.' Chem. Rev. (2010) 110 (10), 5714-5789.

Angman, J. B. 'Spatial distribution of 62H and 6I8O values in the hydrologic cycle of the Nile Basin.' Journal of Arid and (2015) 7(2), 133-145.

Laughland, M. M.; Nelson, D. E.; Wilson, P.; Eastridge E. 'Uncharted waters: what can we learn from waters produced from horizontal wells in the Permian Basin?' Paper presented at the SPE/AAPG/SEG Unconventional Resources Technology Conference, Denver, CO (2014) Paper No. URTEC-1926712-MS.

Long H.; Michael E.; Bordoloi S.; Lui Y.; Rajappa B.; Weaver B.; McMahan N; McLin, K. 'Integrating oil and water geochemistry to assess SRV and DRV in the Bakken/Three Forks Hybrid Play.' Paper presented at the SPE/AAPG/SEG Unconventional Resources Technology Conference, Virtual, (2020) Paper No. URTEC-2020-2470-MS.

Liw, F.; Michael E.; Johansen, K.; Brown, D.; Allwardt, J. 'Time-lapse geochemistry (TLG) application in unconventional reservoir development.' Paper presented at the SPE/AAPG/SEG Unconventional Resources Technology Conference, Austin, TX (2017) Paper No. URTEC-2670186-MS.

McCaffrey, M. A.; Ohms, D. H.; Werner, M.; Stone, C.; Baskin, D. K.; Patterson, B. A. 'Geochemical allocation of commingled oil production or commingled gas production.' Paper presented at the SPE Western North American Region Meeting, Anchorage, Alaska (2011) Paper No. SPE-144618-MS.

McCaffrey, M. A.; Baskin, D. K.; Ohms, D. H.; Patterson, B. A; Stone, C.; Reisdorf, D. 'Oil fingerprinting dramatically reduces production allocation costs.' World Oil (2012) 55-59.

McCaffrey, M. A; Legarre, H. A.; Johnson, S. J. 'Using biomarkers to improve heavy oil reservoir management: An example from Cymric Field, Kern County, California.' AAPG Bull. (1996) 80 (6), 898-912.

McCaffrey, M. A.; Baskin, D. K.; Beeunas, M. A.; Patterson, B. A. 'Reducing the cost of production allocation by 95% using a geochemical technique.' AAPG Annual Convention, Houston, TX (2006) (Abstract).

Muehlenbachs, K. 'The oxygen isotopic composition of the oceans, sediments and the seafloor.' Chemical Geology (1998) 145(3-4), 263-273.

Nouvelle, X.; Rohas, K.; 'Novel method of production back-allocation using geochemical fingerprinting.' Paper presented at the Abu Dhabi International Petroleum Conference and Exhibition, Abu Dhabi UAE (2012) paper No. SPE-160812-MS.

Rasdi, F.; Salman, A.; Adams, D. A.; Sofer, Z. 'An investigation of vertical and lateral communication in an unconventional oil reservoir using geochemistry and reservoir simulation.' paper presented at the PE Canadian Unconventional Resources Conference, Calgary, Alberta, Canada (2012) Paper No. SPE-162673-MS.

Ruffier-Meray, V.; Ungerer, P.; Carpentier, B.; Courcy, J. P. 'Fractionation of hydrocarbons between oil and gas phases.' Revue de l'Institut Français du Pétrole, EDP Sciences, 53 (3), 379-390.

Sandvik, E. I.; Mercer, J. N. 'Primary migration by bulk hydrocarbon flow.' Org. Geochem. (1990) 16(1-3), 83-89.

Can Graas, G. W.; Gilje, A. E.; Ison, T. P.; Tau, L. A. 'The effects of phase fractionation on the composition of bils, condensates and gases.' Org. Geochem.(2000), 31(12), 1419-1439.

(56) References Cited

OTHER PUBLICATIONS

Whitson, C. H.; Sunjerga, S. 'PVT in liquid-rich shale reservoirs.' Paper presented at the SPE Annual Technical Conference and Exhibition, San Antonio, TX (2012), Paper No. SPE-155499-MS.

* cited by examiner

HISTOGRAM OF PRODUCED
OIL API GRAVITY

API GRAVITY PREDICTION
WITH WHOLE OIL GC
COMPOSITION

HISTOGRAM OF SEPARATOR
OIL API GRAVITY

FIG. 7

FIRST 12 MONTHS
CUM GOR PREDICTION

FIRST 12 MONTHS
CUMULATIVE WATER CUT

FIRST 12 MONTHS CUM
WATER CUT PREDICTION          FIG. 11

TYPICAL ORGANIZATION OF MACHINE LEARNING DATA

| | PREDICTORS | | | | | | PREDICTION TARGET (e.g., CUM GOR) |
|---|---|---|---|---|---|---|---|
| | BASIC WELL GEOLOGY DATA | BASIC WELL ENGINEERING DATA | TIME LAPSE 1 | FINGERPRINTS 1 | TIME LAPSE 2 | FINGERPRINTS 2 | |
| WELL 1 | | | | | | | o o o |
| WELL 2 | | | | | | | |
| WELL 3 | | | | | | | |
| | o o o | o o o | o o o | o o o | o o o | o o o | o o o |
| WELL N | | | | | | | |

FIG. 15

TYPICAL MACHINE LEARNING PREDICTORS AND PREDICTION TARGETS

| PREDICTORS (FEATURES) | | PREDICTION TARGET |
|---|---|---|
| WELL GEOLOGY | • SURFACE AND BOTTOM HOLE LOCATION, TARGET FORMATION, DEPTH, ETC.<br>• PETROLEUM FLUID MATURITY, IN PLACE RESOURCE DENSITY, ETC.<br>• RESERVOIR QUALITY, RESERVOIR MINEROLOGY, ETC.<br>• PRODUCTION COMMENCE DATE | |
| WELL ENGINEERING DATA | • COMPLETION ENGINEERING DATA: WELL STACKING AND SPACING, LATERAL LENGTH, COMPLETION DESIGN (e.g., JOB TYPE, NUMBER OF STAGES AND CLUSTERS PER STAGE, FLUIDS PUMPED, PROPPANT PUMPED),<br>• RESERVOIR ENGINEERING DATA: RESERVOIR TEMPERATURE AND PRESSURE, FLOWING BOTTOM HOLE PRESSURE, TUBING PRESSURE, CHOKE SETTING, SEPARATOR PT CONDITIONS, ETC. | • PRODUCED FLUIDS PROPERTIES, e.g., OIL API GRAVITY, OIL VISCOSITY, SULFUR CONTENT, GAS SPECIFIC DENSITY, GAS BTU, $H_2S$ CONTENT<br>• DAILY OR HOURLY PRODUCTION GOR, CGR, WATER CUT<br>• CUMULATIVE PRODUCTION PERFORMANCE, e.g., FIRST 12 MONTHS OIL, FIRST 24 MONTHS OIL, FIRST 12 MONTHS CUM GOR, FIRST 24 MONTHS CUM WATER CUT<br>• PRODUCTION FLOW ASSURANCE RISK, e.g., WAX DEPOSITION, SCALE FORMATION, PRODUCTION TUBING CORROSION |
| GEOCHEMICAL FINGERPRINTS OF PRODUCED FLUIDS | • PRODUCED OIL GEOCHEMICAL FINGERPRINTING BY HRGC, GCXGC, GC-MS, LC-MS, GC-IR-MS, NMR, IR SPECTROSCOPY, RAMAN SPECTROSCOPY, ETC.<br>• PRODUCED GAS GEOCHEMICAL FINGERPRINTING BY HRGC, GC-MS, MS, GC-IR-MS, IR SPECTROSCOPY, RAMAN SPECTROSCOPY<br>• PRODUCED WATER GEOCHEMICAL FINGERPRINTING BY IC, ICP, ICP-MS, HPLC, GC-MS, LC-MS, CE<br>• SAMPLE COLLECTION DATES | |

FIG. 16

FINGERPRINTING AND MACHINE LEARNING FOR PRODUCTION PREDICTIONS

PRIOR RELATED APPLICATIONS

This application claims priority to 63/196,639, filed Jun. 3, 2021, and incorporated by reference in its entirety for all purposes.

FEDERALLY SPONSORED RESEARCH STATEMENT

Not applicable.

FIELD OF THE DISCLOSURE

The disclosed methods relate generally to the optimization of a reservoir using time lapse geochemical fingerprinting and machine learning to develop more accurate predictive models and thereby optimize a production plan.

BACKGROUND OF THE DISCLOSURE

Geochemical fingerprinting is a rapidly expanding discipline in the earth and environmental sciences. It is anchored in the recognition that geological processes leave behind unique chemical and isotopic patterns in the rock record. Many of these patterns, informally referred to as "geochemical fingerprints," differ only in fine detail from each other. For this reason, geochemical fingerprinting requires analytical data of very high precision and accuracy.

At the reservoir scale, steep gradients in oil composition and associated fluid properties are understood to be the product of preferential biodegradation of different hydrocarbons, which gives oils a distinct molecular signature or "fingerprint" related to level of degradation. In conventional oil fields, variations in petroleum composition may arise from one or a combination of water washing, source maturity, source facies variation, oil biodegradation, as well as charging and mixing of oils from different source rocks or of different maturity. In heavy oils and oil sands reservoirs, large-scale vertical and small-scale lateral variations in oil composition and fluid properties developed via interaction of biodegradation and charge mixing, resulting in orders of magnitude variation in viscosity over the thickness of the reservoir and large molecular variation in single wells.

The natural variability in oil composition can be used to allocate oil production along a long horizontal well or to assess the contribution of different production streams in a commingled well by mapping the original oil composition distribution. This procedure is now applied in many heavy oil fields worldwide as part of standard production monitoring procedures.

However, geochemical fingerprinting is by necessity an extremely data intensive process, and significant work is needed to improve data collection and analysis, as well to develop new applications of this powerful technology.

U.S. Pat. No. 11,002,722, for example, describes the use of time lapse geochemical fingerprinting to allocate production or to optimize well placement. In that patent, since the time lapse fingerprint data was exceedingly complex, the oil, gas and water fingerprint data was simplified for use by generating ratios of compounds, and selecting for use only those ratios that were reasonably constant between core and production samples.

This application obviates the need for data simplification and provides more powerful predictive methods for applications to reservoir optimization.

SUMMARY OF THE DISCLOSURE

The method allows the prediction of production characteristics from a well using time lapse geochemical fingerprinting and machine learning. The method involves obtaining a plurality of samples from a well in a reservoir over a period of time and assigning both a time and a location identifier to each of said plurality of samples. Each of the plurality of samples is chemically fingerprinting to obtain time lapse fingerprint data and each is assessed for one or more production characteristics to obtain time lapse production characteristics.

Both the time lapse fingerprint data and the time lapse production characteristics are used to train a reservoir model using machine learning to obtain an optimized reservoir model. The trained model is then used with time lapse fingerprinting data from a new well or new well zone in the trained model to predict one or more future production characteristics from said new well or any new well. The method can also be used with the same well to predict future production of that well. Ultimately, this information is used to optimize a production plan, which is then used in future production of hydrocarbons from that well.

The present methods include any of the following embodiments in any combination(s) of one or more thereof:

A method of predicting hydrocarbon production characteristics from a well, comprising:
a) obtaining a plurality of samples from one or more wells in a reservoir over a period of time;
b) assigning a time and location identifier to each of said plurality of samples;
c) obtaining one or more production characteristics corresponding to each of said plurality of samples to obtain time lapse production characteristics;
d) chemically fingerprinting each of said plurality of samples to obtain time lapse fingerprint data;
e) training a machine learning model with said time lapse fingerprint data and said time lapse production characteristics to obtain an predictive model;
f) obtaining a plurality of new samples from a new well or new well zone in said reservoir over a period of time;
g) assigning a time and location identifier to each of said plurality of new samples;
h) chemically fingerprinting each of said plurality of new samples to obtain new time lapse fingerprint data;
i) predicting one or more future production characteristics from said new well or said new well zone using said predictive model and said new time lapse fingerprint data;
j) optimizing a production plan based on said predicted production characteristics; and
k) producing hydrocarbons from said new well or said new well zone using said optimized production plan.

A method of predicting hydrocarbon production characteristics from a well, comprising:
a) obtaining a plurality of samples from one or more wells in a reservoir over a period of time;

-continued b) assigning a time and location identifier to each of said plurality of samples;
c) obtaining one or more production characteristics corresponding to each of said plurality of samples to obtain time lapse production characteristics;
d) chemically fingerprinting each of said plurality of samples to obtain time lapse fingerprint data;
e) training a machine learning model with said time lapse fingerprint data and said time lapse production characteristics to obtain an predictive model;
f) predicting one or more future production characteristics from said well using said predictive model and said new time lapse fingerprint data;
g) optimizing a production plan based on said predicted production characteristics; and
h) producing hydrocarbons from said well using said optimized production plan.

Any method described herein, said samples selected from one or more of core samples; cutting samples; produced oil, water or gas samples; fractions of produced oil, water or gas samples; drilling mud samples; or mud gas samples.

Any method described herein, wherein said production characteristics are selected from production gas to oil ratio (GOR), production condensate to gas ratio (CGR), production water cut, cumulative oil production volume, cumulative gas production volume, cumulative water production volume, cumulative production GOR, cumulative production CGR, cumulative production water cut, produced oil API gravity, risk of wax precipitation, risk of scale formation.

Any method described herein, wherein a support vector machine (SVM) regression model with radial basis function kernel is used for static fluid property predictions.

Any method described herein, wherein a convolution neural network (CNN) regression model is used for dynamic production performance predictions.

Any method described herein, wherein location includes depth and lateral placement (x, y and z axes).

Any method described herein, wherein well completion parameters are added to said reservoir model.

Any method described herein, wherein any fingerprinting step uses high resolution gas chromatography (HRGC); gas chromatography (GC); mass spectrometry (MS); GC-MS; Fourier Transform Ion Cyclotron Resonance MS (FTICR-MS); thin layer chromatography (TLC); two dimensional TLC (2D TLC); capillary electrophoresis (CE); high pressure liquid chromatography (HPLC); Fourier Transform Infra-Red (FTIR) spectrophotometry; X-ray fluorescence (XRF); atomic absorbance spectrophotometry (AAS); Inductively Coupled Plasma MS (ICP-MS); Ion Chromatography (IC); nuclear magnetic resonance (NMR); 2D GC-time of flight MS (GCxGC-TOFMS); saturate, aromatic, resin, and asphaltene levels (SARA levels); carbon, nitrogen, oxygen and sulfur analysis (CHNOS analysis); elemental analysis; GC isotope ratio MS (GC/IR-MS); or combinations thereof.

Any method described herein, further comprising obtaining well characteristics and including said well characteristics in said training step.

Any method described herein, wherein said well characteristics include one or more of well length, well depth, well fracturing, well stimulation method, and well completion type.

Any method described herein, wherein said machine learning model uses regression, such as linear regression, multiple Linear regression, polynomial regression, decision tree regression or random forest regression.

Any method described herein, wherein the model is optimized and evaluated a plurality of times with a variety of random train test splits, until said random splits produced similar train and validation mean absolute error curves.

Any method described herein, wherein said samples are produced water samples, and said fingerprints from said water samples include two or more isotopes selected from chlorine, bromide, strontium, water deuterium, water oxygen, sulfur, iron, and the like.

Any method described herein, wherein said samples are produced gas samples and gas fingerprints from said gas samples include one or more of carbon13 level, sulfur34 level, methane level, ethane level, propane level, butane level, pentane level, and H2S level.

Any method described herein, wherein said samples are produced oil samples oil and said fingerprints of said oil samples include one or more of API gravity, elemental composition, and SARA levels.

As used herein a "fingerprint" is the chemical and/or isotopic components of a sample and is typically complex enough to uniquely identify the source of oil, gas and water samples. "Fingerprinting" refers to the analyses needed to generate the fingerprints.

As used herein a "time lapse fingerprint" is fingerprint of samples that were collected over a period of time. The samples may be collected at various intervals, and the intervals need not be uniform.

As used herein, "dynamic production performance predictions" are production rates, cumulative production volumes, product ratios, e.g. gas oil ratio (GOR) or condensate gas ratio (CGR), and water cut, and "static production performance predictions" are properties of produced fluids, e.g., oil API gravity, viscosity, pour point, wax deposition propensity, sourness, gas specific gravity, acidic gas content, inert gas content, and combustion energy.

As used herein, a "biomarker" in chemistry and geology are any suite of complex organic compounds composed of carbon, hydrogen and other elements or heteroatoms such as oxygen, nitrogen and sulfur, that are found in crude oils, bitumen, petroleum source rock and eventually show simplification in molecular structure from the parent organic molecules found in all living organisms. Essentially, they are complex carbon-based molecules derived from formerly living organisms. Each biomarker is quite distinctive when compared to its counterparts, as the time required for organic matter to convert to crude oil is discreet. Most biomarkers also usually have high molecular mass.

Some examples of biomarkers found in petroleum are pristane, triterpanes, steranes, phytane and porphyrin. Such petroleum biomarkers are produced via chemical synthesis using biochemical compounds as their main constituents. For instance, triterpanes are derived from biochemical compounds found on land angiosperm plants. The abundance of petroleum biomarkers in small amounts in its reservoir or source rock make it necessary to use sensitive and differential approaches to analyze the presence of those compounds. The techniques typically used include gas chromatography and mass spectrometry.

As used herein, a "reservoir" is a formation or a portion of a formation that includes sufficient permeability and porosity to hold and transmit fluids, such as hydrocarbons or water or natural gas, and the like.

A reservoir can have a plurality of chemically distinct "zones" therein, particularly in very tight rock, where mixing is almost non-existent. The data herein can be catalogued by zone, allowing that portion of the data to be used for other zones, even in other wells, as long as the zone has similar fingerprints.

A "production plan" can include placement of wells, length of well, depth of well, completion details, enhanced oil production methods, stimulation methods, fracking methods, order of completion, production rate, and the like. Production plans include well stacking, well spacing, completion designs (frac job types, job size, number of stages, number of clusters per stage, etc.) and strategies (e.g., at what sequence to frac different target zones, how to synchronize/coordinate with nearby wells), production well pressure management, enhanced oil recovery strategies, and the like.

An "optimized" production plan is generated using well predictions and modeling to improve the simulated production from a well. Once a well plan is optimized, it may then implemented at the well, at a well pad with multiple wells, or in an area penetrating one or more reservoirs and thereby used for the production of hydrocarbons or other reservoir fluids. As additional data is collected, the plan may be further optimized.

As used herein, "landing zone" refers to the location where an oil is actually produced from a horizontal well.

As used herein, "SARA fractions" refers to the four fractions (%) of crude oil that can be separated, including saturates, aromatics, resins and asphaltenes. SARA quantification is typically performed by IP-143 and ASTM D893-69 standards.

As used herein, "water cut" is the ratio of water produced compared to the volume of total liquids produced.

As used herein, "Gas Oil Ratio" or "GOR" is the volume of gas that is produced from crude oil when the oil is being extracted from the reservoir to the earth's surface through production tubing. This is generally related to associated gas or saturated gas in the oil reservoir. It is represented as standard cubic feet per stock tank barrel (scf/stb).

The "associated gas" is natural gas that is dissolved in the oil and is produced along with the crude oil. Heavy crude oil has low API gravity and low capacities of dissolved gas as compared to lighter crude oil.

"Steam to Oil Ratio" or "SOR" is a measure used to quantify the efficiency of production of oil from a reservoir based on steam injection into the reservoir. It can be defined as the amount of steam injected to produce one unit volume of crude oil. The steam is quantified by barrels of water used to make the steam, however. For example, a steam-oil ratio of 4.5 means that 4.5 barrels of water—converted into steam and injected into the well—were required to extract a single barrel of oil.

"API gravity" measures the relative density of petroleum liquid and water and has no dimensions. To derive the API gravity, the specific gravity SG is first measured using either the hydrometer, detailed in ASTM D1298 or with the oscillating U-tube method detailed in ASTM D4052. The official formula used to derive the gravity of petroleum liquids from the specific gravity (SG), as follows: API gravity=$141.5/SG-131.5$.

A "core" or "rock core" is a sample of rock, typically in the shape of a cylinder. Taken from the side of a drilled oil or gas well, a core is then dissected into multiple core plugs, or small cylindrical samples measuring about 1 inch in diameter and 3 inches long.

"Drilling cuttings" or "cutting samples" are the small irregular rock samples generated during drilling and returned with the drilling mud.

By "obtaining" a sample herein we do not necessarily imply contemporaneous sampling procedures as existing samples can be used where available. However, often contemporaneous sample collection will be needed, except for core or cutting samples, which may already be available.

By generating a reservoir "map" we mean that the reservoir is characterized in the three directional axes as well as potentially the fourth time axis, but we do not necessarily imply a graphical representation thereof, as data can be maintained and accessed in many forms, including in tables. The map maybe segmented into zones, where the fingerprinting data is very similar.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of is closed, and excludes all additional elements.

The phrase "consisting essentially of excludes additional material elements, but allows the inclusions of non-material elements that do not substantially change the nature of the invention. Any claim or claim element introduced with the open transition term "comprising," may also be narrowed to use the phrases "consisting essentially of" or "consisting of." However, the entirety of claim language is not repeated verbatim in the interest of brevity herein.

The following abbreviations are used herein:

| Abbreviation | Term |
|---|---|
| AAS | Atomic Absorbance Spectrophotometer |
| API | American Petroleum Institute, also API gravity, is a measure of how heavy or light a petroleum liquid is compared to water: if its API gravity is greater than 10, it is lighter and floats on water; if less than 10, it is heavier and sinks. |
| Bbl | Barrel |
| BVO | Bulk volume oil |

-continued

| Abbreviation | Term |
| --- | --- |
| CE | Capillary electrophoresis |
| CGR | Condensate gas ratio-CGR gives a measure of the liquid content to the volume of gas. It is measured in barrels per millions of standard cubic feet (barrels/mmscf). |
| CNN | Convolutional neural networks-a class of neural networks comprised of node layers, containing an input layer, one or more hidden layers, and an output layer. Each node connects to another and has an associated weight and threshold. If the output of any individual node is above the specified threshold value, that node is activated, sending data to the next layer of the network. Otherwise, no data is passed along to the next layer of the network. |
| COP | Cumulative oil production |
| CUM | Cumulative |
| FTICR | Fourier transform ion cyclotron resonance |
| FTIR | Fourier transform infra-red |
| GC | Gas chromatography |
| GC-IR-MS | Gas chromatography isotope ratio mass spectrometry |
| GCxGC | 2D gas chromatography |
| GOR | Gas to oil ratio- When oil is produced to surface temperature and pressure it is usual for some natural gas to come out of solution. The gas/oil ratio (GOR) is the ratio of the volume of gas that comes out of solution to the volume of oil at standard conditions (Temperature = 273.15 K, Pressure = 1 bar) |
| GR | Gamma ray |
| HPLC | High pressure liquid chromatography |
| HPS | High pressure separator |
| HRGC | High resolution GC |
| IC | Ion Chromatography |
| ICP-MS | Inductively coupled plasma MS |
| MAE | Mean absolute error |
| MPLC | Medium pressure liquid chromatography |
| MS | Mass spectrometry |
| NMR | Nuclear magnetic resonance |
| PV | Pressure volume |
| PVT | pressure volume temperature |
| SARA | Saturates, aromatics, resins, asphaltenes |
| SCF | Standard cubic foot |
| SOR | Steam to oil ratio |
| SVM | Support vector machine-also support-vector networks, are supervised learning models with associated learning algorithms that analyze data for classification and regression analysis. |
| TLC | thin layer chromatography |
| TLG | Time lapse geochemistry-geochemical fingerprints taken from a plurality of samples collected over time |
| TOFMS | Time of flight mass spectrometry |
| XRF | X-ray Fluorescence |

BRIEF DESCRIPTION OF THE DRAWINGS

FIG. 7. Cumulative GOR prediction from CNN model train and validation mean absolute error (mae). Epoch on the y axis is a machine learning term, not a geological time unit, that specifies how many times one runs through the training cycle.

FIG. 15. Typical organization of machine learning data.

FIG. 16. Typical machine learning predictors and prediction targets.

DETAILED DESCRIPTION OF THE DISCLOSURE

Figure 1:
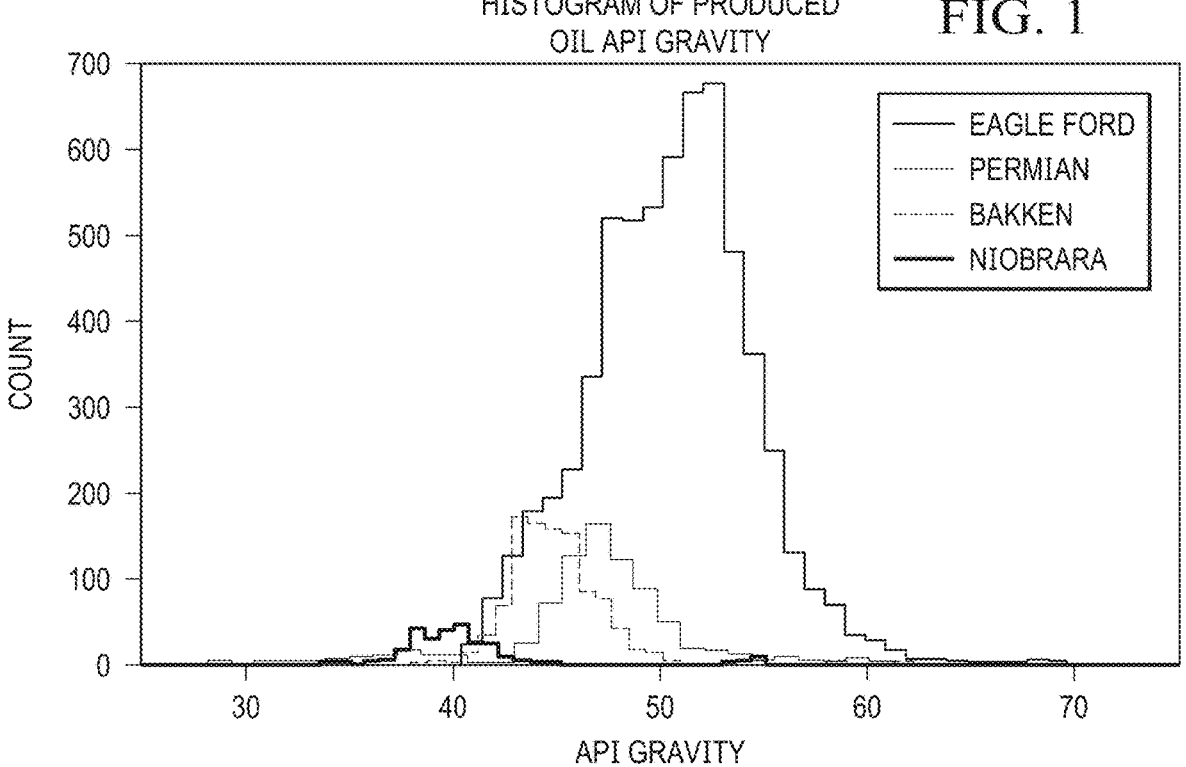
FIG. 1. Measured API gravity of produced oils from Eagle Ford, Permian, Bakken and Niobrara plays. Count on the y axis refers to the number of samples/observations falling in a specific x-value range.

Time lapse geochemistry in unconventional reservoirs is well established for purposes of understanding well drainage height, monitoring well interference and effectiveness of well completions, although the complex datasets are typically simplified before use. The method reported herein does not simplify the data, but instead uses artificial intelligence methods and measured data to train a model, thus allowing use of a larger dataset and improving the predictive power of the model.

The method described herein allows the use of time lapse geochemistry for a multitude of well performance and production issue predictions and diagnoses, representing a paradigm shift in leveraging geochemistry for development and production optimizations. It provides an independent cross validation of conventional engineering methods, e.g., pressure transient analysis, to gauge the efficacy of completions, and interval or long term well performance. The ability to make predictions based on the produced fluids sampled in the earlier stage of a given well's life cycle is a significant advantage, which enables optimizing operation and/or completion at a faster pace to maximize the asset value.

Over recent years, large quantities of time lapse geochemistry data have been collected across our unconventional assets. Machine learning with these time lapse geochemistry data together with corresponding production and completion data enabled accurate prediction of key production metrics, like GOR, water cut and cumulative oil volume, and potential flow assurance related problems. These predictions augment and cross-validate any predictions based on standard engineering approaches. The ability to make predictions based on the produced fluids sampled in the earlier stage of a production well's life cycle is a significant advantage, which enables optimizing operation and/or completion at faster pace to maximize the value of production assets.

Samples—

Samples that can be collected for training purposes include core samples, cutting samples obtained while drilling, mud samples, mud gas samples, whole oil, gas and water samples obtained during production, fractions thereof such as aromatic oil fraction samples, condensate samples, and the like.

Analysis of Samples—

The samples are then analyzed by one or more methods to provide accurate fingerprints of the contents. We have exemplified the methods herein using HRGC, but any methods or combinations of methods can be used, including Gas Chromatography (GC), Mass Spectrometry (MS), GC-MS, thin layer chromatography (TLC), including 2D TLC, capillary electrophoresis (CE), High Pressure Liquid Chromatography (HPLC), Fourier Transform Infra-Red (FTIR) Spectrophotometer, X-ray Fluorescence (XRF), Atomic Absorbance Spectrophotometer (AA or AAS), Inductively Coupled Plasma Mass Spectrometry (ICP-MS), Ion Chromatography (IC), Nuclear Magnetic Resonance (NMR), two-dimensional gas chromatography time-of-flight mass spectrometry (GCxGC-TOFMS), Fourier Transform Ion Cyclotron Resonance mass spectrometry (FTICR-MS), and the like. Additional analysis can include gas compounds, isotopes, bulk oil parameters (API gravity, SARA, CHNOS, elemental), whole oil-GC, aromatics-GCMS (biomarkers), and the like.

Bulk oil analysis methods can also be applied, including e.g., chemical composition, elemental composition, metals, density, specific gravity, API gravity, viscosity, surface tension, interfacial tension, volatility, liquefaction, solidification, carbon residue, Conradson, Ramsbottom, microcarbon, aniline point, specific heat, heat content, enthalpy, PVT relationships, heat of combustion, critical properties, electrical conductivity, dielectric constant, dielectric strength, dielectric loss, power factor, color, refractive index, optical activity, fractional composition, atmospheric distillation, vacuum distillation, solvent treatment, asphaltene separation, fractionation, gas chromatography, simulated distillation, adsorption chromatography, gel permeation chromatography, ion-exchange chromatography, high-performance liquid chromatography, supercritical fluid chromatography, thin layer chromatography, structural group analysis, molecular weight, mixed aniline point, correlative methods, evaporation rate, flash point, Kauri-butanol value, odor, color, volatility, storage stability, thermal stability, sediment, and the like.

In some cases, it may be necessary to separate the samples into two or more fractions before submitting sub-fractions to fingerprinting analysis, because oil components can range from C1 to >C40 in some polyaromatic hydrocarbons, and because there are instances where certain components can interfere with a particular analysis. However, fingerprinting and chemical analyses are well known in oil and gas development, and the person of ordinary skill knows how to apply a correct methodology to a given sample type.

Data Consistency:

Fingerprint data can have considerably variability depending on the machines used, operator technique, method of sample collection, storage conditions, age of samples, and the like. Therefore, steps should be taken to ensure internal consistency such that the data is more reliable, including e.g., comparing multiple phases (gases, low and high molecular wt. oil fractions), establishing a standardized protocol for sample collection with a single vendor, immediate sample analysis on arrival to minimize aging errors or the use of suitable verified storage conditions, and of course, running external standards and duplicating fluid analyses. In addition, oils and gases can be analyzed at different laboratories and on different instruments for the same wells. By comparing the same samples analyzed in different labs and/or different machines, a margin of error can be established, and if needed stable datapoints can be selected for use in the subsequent analysis and the more variable data elements omitted.

Methods

Time lapse geochemistry sample collection and analysis program is described more detail in Liu (2017) and Jweda (2017). Basically however, when a newly completed well comes on-line, the produced fluids (oil, gas, and water, typically from separator) samples are collected at regularly occurring intervals. It is recommended to collect samples with shorter time interval at the beginning of production, then adjust to the longer time interval as production time lapses for cost saving. Core samples and drilling samples and the like can also be used in the methods herein, although our proof of concept work is simplified herein for demonstration purposes.

Produced oil samples were analyzed for geochemical composition with e.g., high resolution gas chromatography (HRGC), although many different techniques could be used. Produced gas samples were analyzed for the bulk composition with e.g., HRGC and the compound specific isotope composition with e.g., gas chromatography isotope ratio mass spectrometry (GC-IR-MS). Water geochemistry can be similarly analyzed, but was omitted from our proof of concept work.

All machine learning was performed herein with Python, but other packages could be used. Machine learning algorithms include but not limited to: support vector machine (SVM) with radial basis function kernel and convolution neural network (CNN), and the like.

"Predictors" are the geochemical signatures of produced fluids and pertinent sample background information, e.g., well location, well production beginning date, sample collection date. "Prediction targets" are production characteristics, e.g., production volumes, production rates, production product ratios, properties of produced fluids.

No outlier removal was performed on any dataset to ensure the robustness of developed machine learning models for production applications. Sample collections in the field can be challenging under certain circumstances and are prone to errors. Some of the prediction targets are field metering data, which have some uncertainty as well. The model was first trained on a subset of the data, the remaining data then used to test the quality of the predictions produced by the model. We generally used a 3:1 ratio of training to test data and samples from each well were divided this way.

Results

Prediction of Oil API Gravity with Oil GC Composition:

Prediction of petroleum fluid properties with geochemical signatures is one of the primary themes in petroleum geochemistry. Machine learning from a large data set with full spectrum geochemical compositions significantly improves the predictive power, in comparison with traditional geochemistry methods limited to a few selected geochemical characteristics, e.g., biomarker ratios.

FIG. 1 shows the distribution of measured API gravity for 8188 oil samples produced from 949 wells across unconventional assets at Eagle Ford, Permian, Bakken, and Niobrara. On average, each well produced oil samples collected at different production times (TLG samples). Each oil sample was analyzed by HRGC for composition and measured by hydrometer for API gravity. With this dataset, a SVM regression model was developed to predict oil API gravity with its GC compositions.

Figure 2:
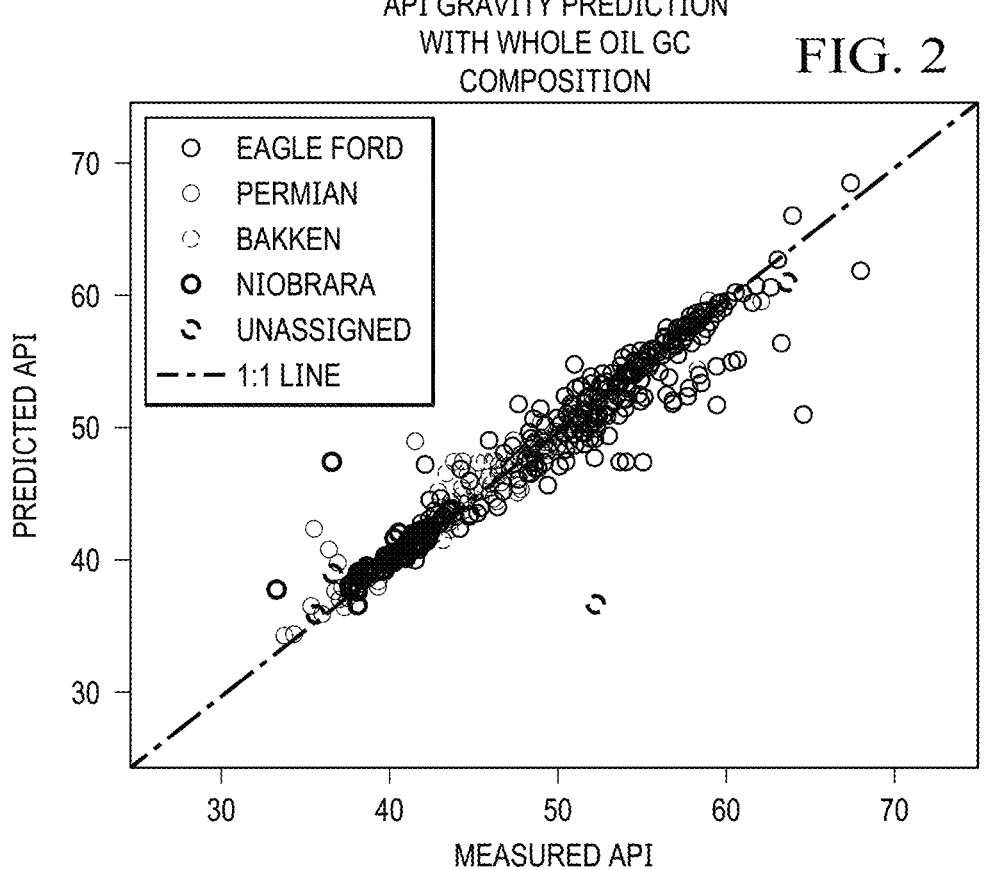
FIG. 2. Whole oil GC API gravity predictions from SVM model test result as compared to measured API.

The predictors were the GC compositions (ppm concentrations of individual peaks). The prediction target was the measured oil API gravity. The dataset was randomly split for model training and test (3:1 train test split ratio). FIG. 2 shows the model test results.

As can be seen, the predicted and measured API are very close to the 1:1 perfect prediction line. These are remarkably accurate predictions of oil API gravity over a large value range solely based on GC compositions, even though characteristics like total sulfur and metal contents, which have very large impacts on oil API gravity, were not included as features.

Note that these oils were produced from plays of drastically different geological settings (ages, source rock types, maturity, etc.). Within the same play, oil samples were produced from wells landed into different zones and at different locations with different completion designs. From the same well, oil samples collected at different dates represent different reservoir and production string PT conditions. Yet, this machine learning model was nimble enough to capture all those effects and still accurately predict oil API gravities.

Figure 3:
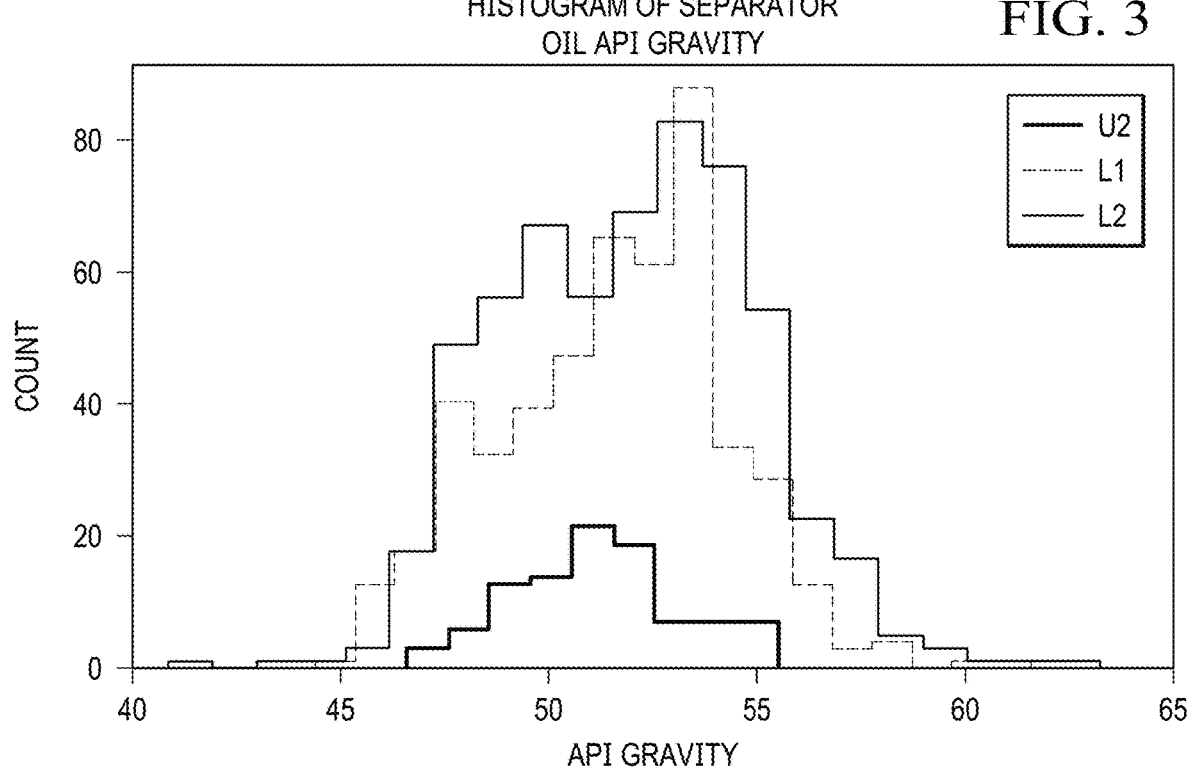
FIG. 3. Measured API gravity of separator oils produced from Eagle Ford. U1 stands for Upper Eagle Ford unit 1, L1 for Lower Eagle Ford unit 1, L2 stands for Lower Eagle Ford unit 2.

Prediction of Oil API Gravity with Composition of Associated Gas:

We sampled produced oil and gas at the separator in pairs for certain wells at Eagle Ford. At the time of the study, there were 1192 pairs of separator oil and gas samples from 189 wells. Each oil sample was measured by hydrometer for API gravity. FIG. 3 shows the histogram of measured API gravity of these oil samples, colored by the landing zones (U1, L1, L2) of production wells. In addition, each gas sample was analyzed for its bulk composition and compound specific carbon isotope composition ($^{\delta 13}$C of C1 to C5).

An SVM regression model was developed to predict the oil API gravity with the compositions of the corresponding separator gas. The predictors were the bulk and isotope compositions of the separator gas. The prediction target was measured API gravity of the separator oil. The dataset was randomly split for model training and test (3:1 train test split ratio).

Figure 4:
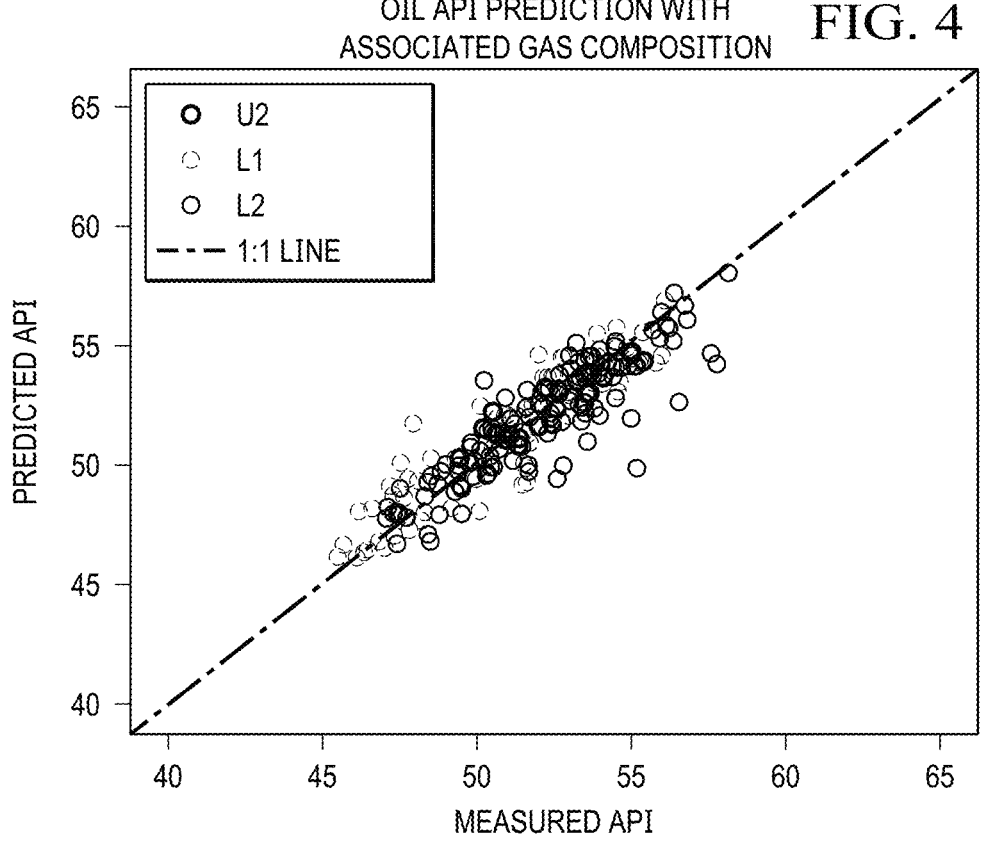
FIG. 4. Separator oil API gravity prediction with separator gas composition from SVM model test result as compared with measured API.

FIG. 4 shows the model test results. Again, machine learning algorithms are able to provide remarkably accurate predictions, given the fact that separator settings, which strongly influence the separator oil and gas compositions, were not even included as model input features. For some wells, the analyzed TLG samples covered time spans over two years, thus the bottom hole pressures had dropped below saturation pressures to break out oil and gas phases. However, even without inputting the reservoir and production string PT conditions, this model accurately predicted oil API gravity solely based on the associated gas composition. These results strongly suggest that PT conditions are geochemically encoded in the gas compositions, on top of the isotope maturity signatures geochemists are familiar with.

Prediction of Production GOR with Produced Oil Composition:

Gas oil ratio (GOR) or condensate gas ratio (CGR) are key economic criteria in long range planning for unconventional production. Traditionally, unlike oil API gravity, production GOR is more challenging to delineate/predict based on geochemistry of produced fluids alone. Over recent years, we have acquired a large amount of TLG oil samples from a relatively large number of unconventional wells at various production stages in terms of pressure draw down. For each TLG oil sample, the corresponding production GOR at the sample collection time was obtained from production metering. These data offer a great opportunity to relate GOR behaviors and produced fluids geochemistry with machine learning in this example experiment.

Figure 5:
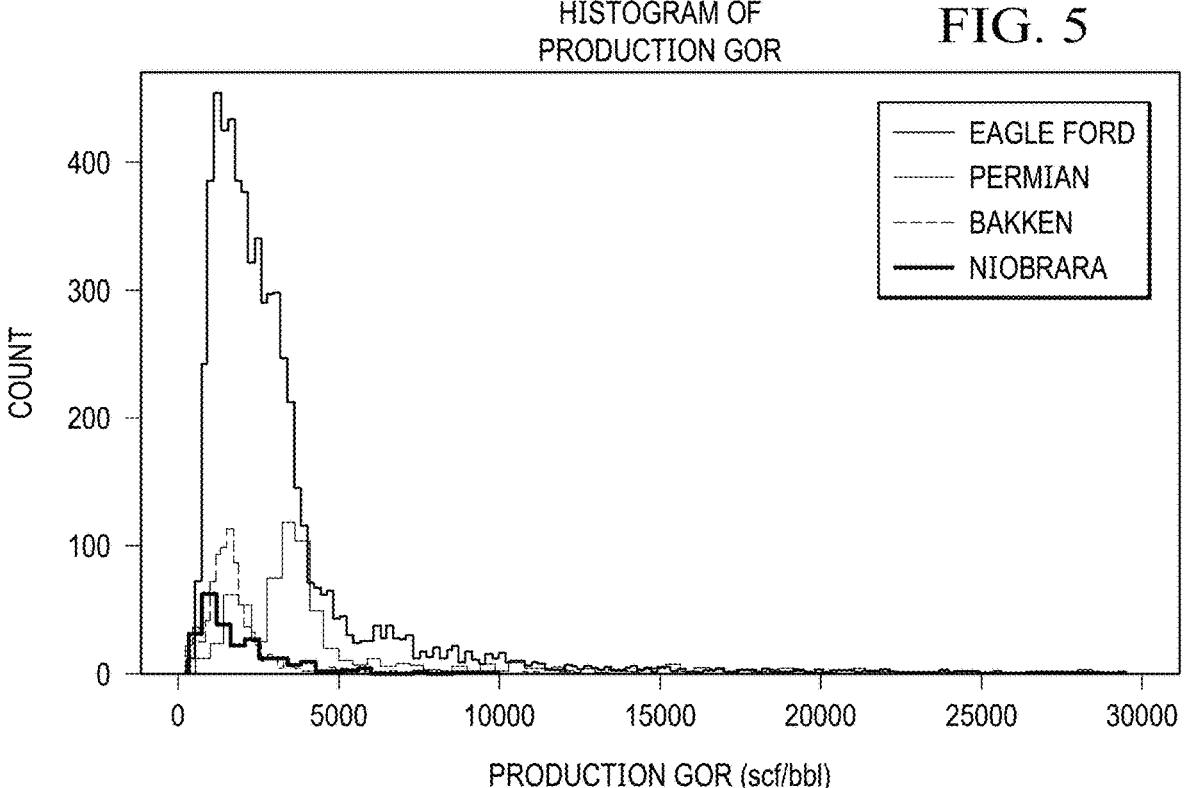
FIG. 5. Histogram of measured daily production GOR at Eagle Ford, Permian, Bakken and Niobrara plays.

FIG. 5 shows the histogram of production GORs associated with all TLG oil samples. After limiting production GOR to below 10,000 scf/bbl (100 bbls/mmscf), a dataset with over 8000 TLG oil samples from over 900 wells across unconventional production plays was used to develop a SVM regression model for predicting production GOR with produced oil geochemistry. The dataset for each well was randomly split for model training and test (3:1 train test split ratio).

Figure 6:
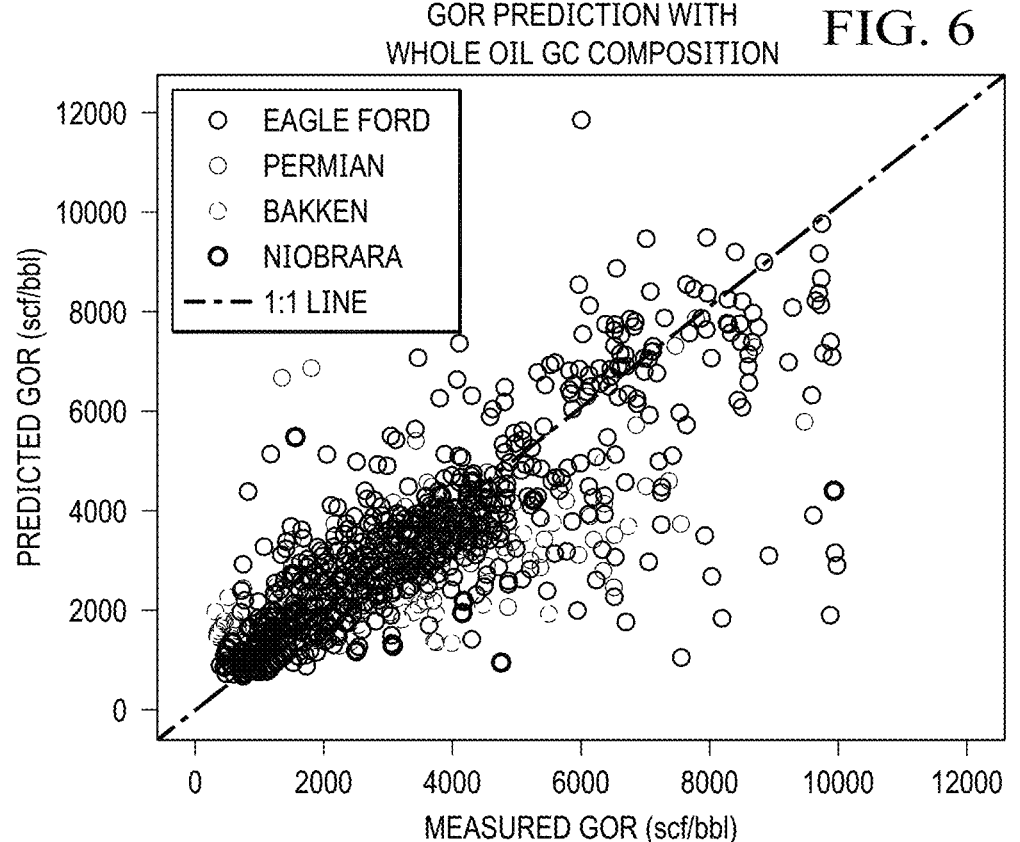
FIG. 6. Prediction of production GOR with produced oil composition from SVM model test result as compared to measured GOR.

FIG. 6 shows the model test results. For this model, the predictors were whole oil GC compositions only. Reservoir, production string and separator PT conditions that have the largest impact on production GOR were not included. However, the HRGC data gave surprisingly good GOR predictions. This strongly indicates that reservoir and production string PT conditions are geochemically encoded in the produced oil compositions, in addition to typical geochemical characteristics of source rock type, maturity, and post generation alterations.

Some of the production GOR data calculated from production metering might not be very accurate due to daily operation issues, contributing to some of the wide spread of the model prediction results. To authors' knowledge, there has not been any studies published that attempt to link production GORs with produced oil geochemistry across different plays. This result demonstrates that, in unconventional production settings, machine learning with geochemistry of produced fluids alone can provide good ballpark estimates of production GOR, to augment and cross-validate GOR predictions based on engineering approaches. The model's predictive capability can probably be improved by including additional data, such as gas and/or water data, and/or the types of additional inputs (e.g., completion engineering data) described herein.

Prediction of Cumulative GOR Based on TLG Samples Collected at Beginning of Production:

Time Lapse Geochemistry or TLG has been systematically implemented at Eagle Ford for over 5 years, and enough data has been accumulated to allow the development of a proof-of-principle play-specific production performance forecast model via machine learning with geochemistry of produced fluids.

The cumulative GOR forecast was the first application attempted. The objective was to predict the first 12 months cumulative GOR for a given well with produced oil samples collected during the first three months of production.

We had collected 2277 oil samples collected from 373 wells during their first three months of productions, on average 6 oil samples per well, some wells with over 20 samples collected in the first three-month production period, some wells less. All these wells had been on production over one year, and the first 12 months cumulative GOR was obtained from production metering.

For machine learning, the predictors were the whole oil GC compositions, the date the oil sample was collected, the date the well came on-line; and the prediction target was the first 12 months cumulative GOR. The dataset was randomly split by well with 3:1 train test split ratio for model development and test.

Multiple deep learning neural network models were developed to predict cumulative GOR, each with different pros and cons, yet with similar overall model performance. One of these models consisted of one input layer, two convolution layers, one pooling layer, two pairs of dense layer and dropout layer, and one output layer. Proper temporal convolution of the time lapse effect fingerprinted in produced fluids composition was important for model success. As number of observations was relatively small, while the number of features relatively large, the model had to be constructed and trained properly to avoid overfitting.

Figure 7:
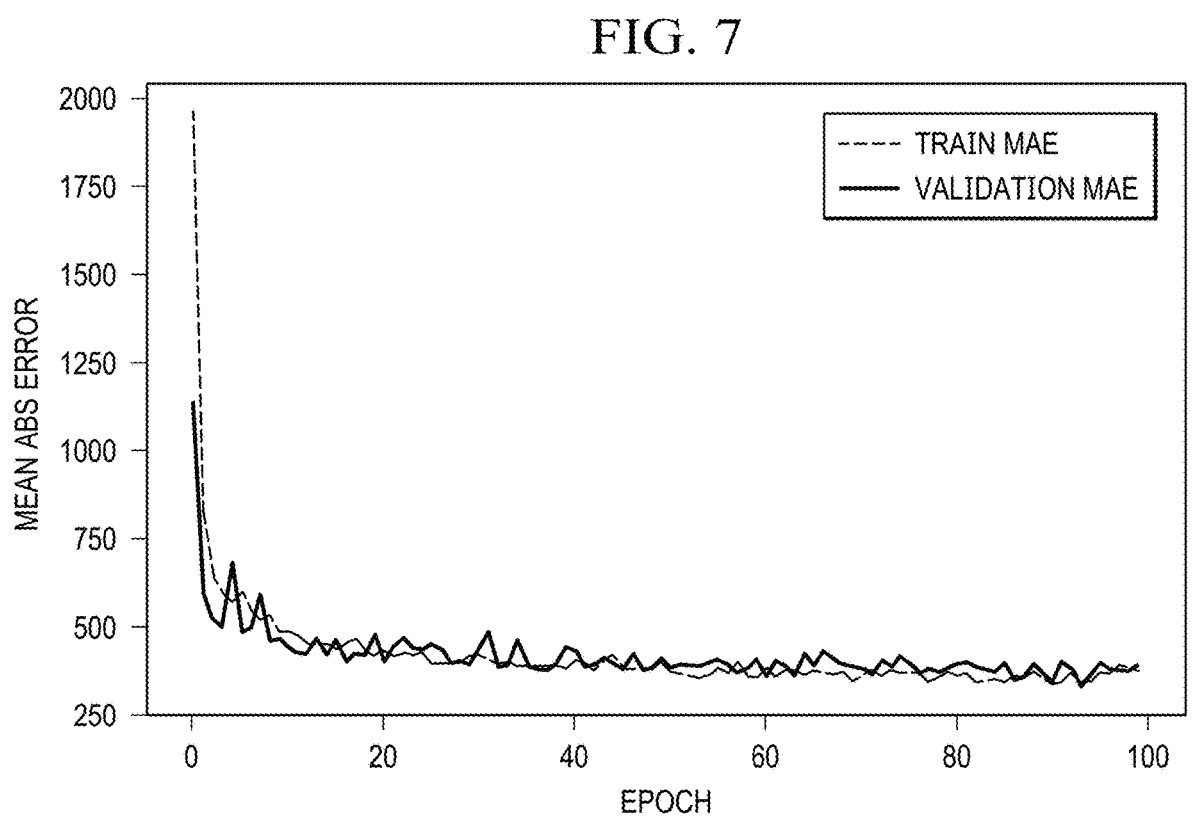

FIG. 7 shows the model training and validation results. As this model was developed with a large number of features, yet with a relatively small number of observations, it was optimized/evaluated many times with different random train test splits, until any random splits produced similar train and validation mean absolute error (mae) curves, as shown in FIG. 7.

Figure 8:
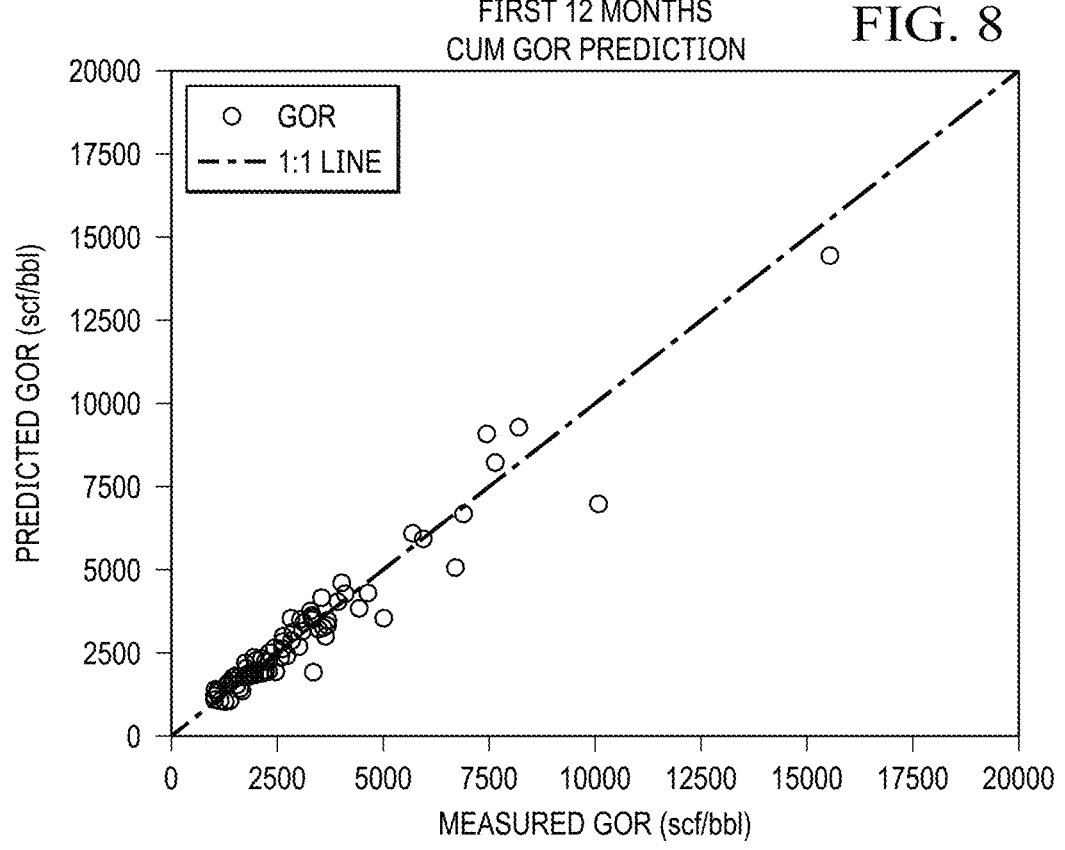
FIG. 8. Cumulative GOR forecast from CNN model test result as compared with measured cumulative GOR.

FIG. 8 shows the model test results, forecasting the first 12 months cumulative GOR for about 100 Eagle Ford wells with produced oils sampled during the first three months of production. Note these Eagle Ford wells represent different locations, landing zones, and vintages of completions from year 2014 to 2020. It is remarkable that this model can accurately forecast the cumulative GOR solely based on the evolution of produced oils, heralding a true breakthrough in unconventional production forecasting.

Prediction of Cumulative Production Oil Volume:

A CNN model similar to the cumulative GOR prediction described in the prior example was developed for cumulative oil production volume forecast with the same dataset as above. Two additional features, the lateral length of each well, and number of days each well flowed during the first year, were added as predictors, and the prediction target changed to cumulative oil instead of cumulative GOR.

Figure 9:
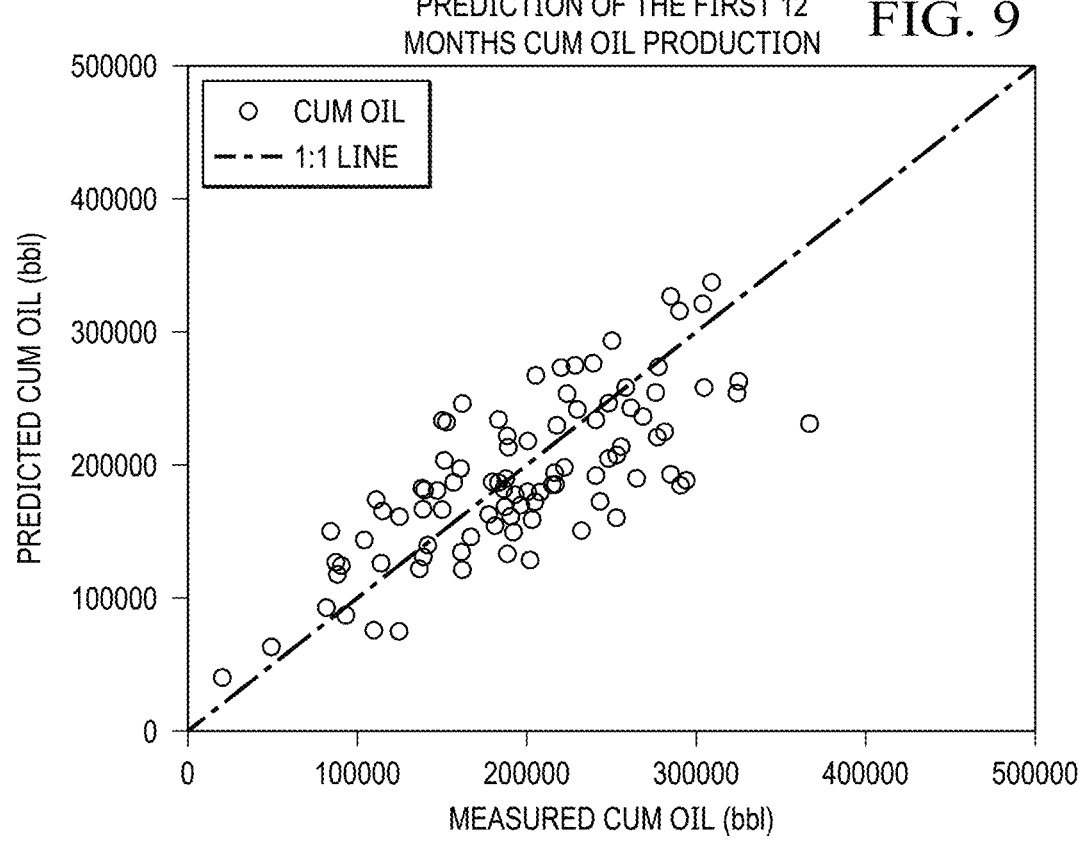
FIG. 9. Cumulative oil production volume forecast from CNN model test result as compared with measured cumulative oil production.

FIG. 9 shows the model test results, forecasting the first year cumulative oil for about 100 Eagle Ford wells with produced oils sampled during the first three months of production. Noticeably, cumulative oil prediction results were not as good as the cumulative GOR. This is because there are more factors affecting cumulative oil volume than cumulative GOR. However, this result is still on par with, if not better than, engineering production forecasts (e.g., pressure transient and decline curve analyses) based on data from the first three months of production. Further, the predictions can probably be improved by incorporating completion and reservoir engineering data, completion type, job size, pressure draw down, etc. We also did 24 and 36 month predictions (data available, but not shown) and the predictions continued to hold up well over longer time periods.

Prediction of Cumulative Water Cut:

Water cut is a key concern in unconventional production, particularly where large quantities of produced water need to be purified and recycled or disposed. In conventional exploration and reservoir development, geochemistry has been applied to delineate oil-water contacts and reservoir water saturations. Water washing effects on petroleum fluids has been well established as well. Time lapse geochemistry of produced oil can also be harnessed by machine learning to predict the production water cut.

Figure 10:
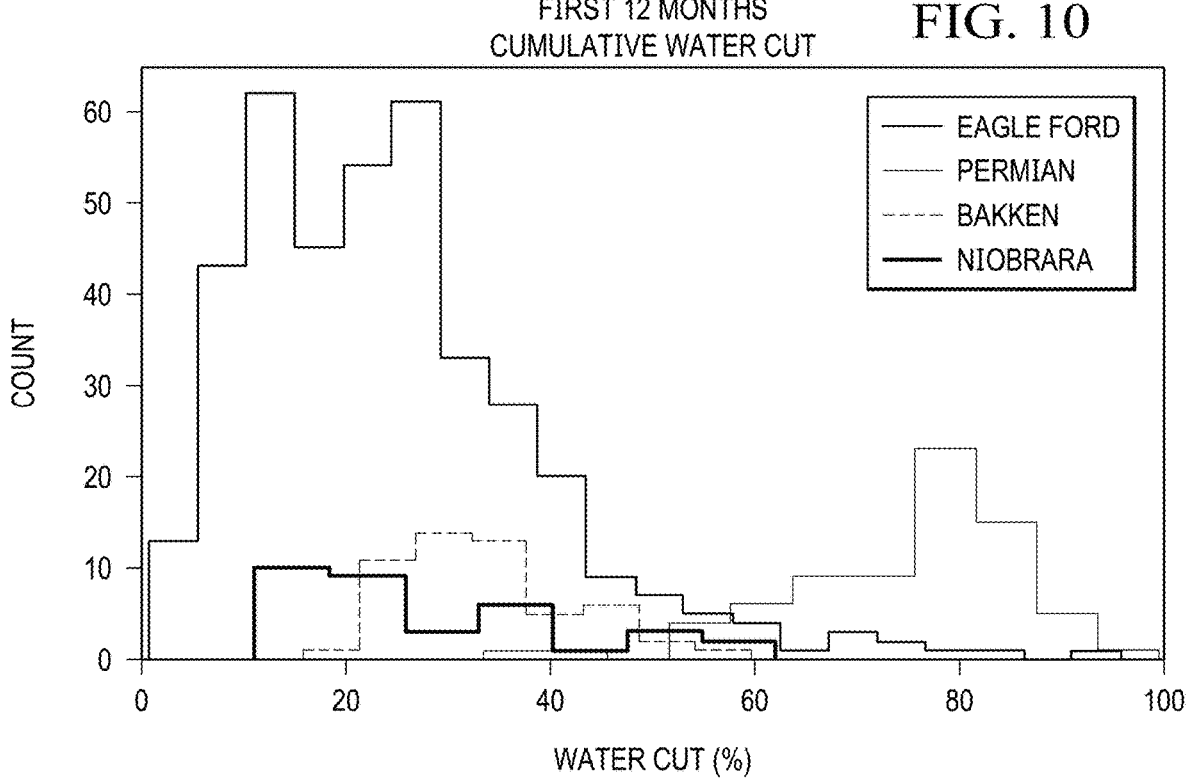
FIG. 10. First 12 months measured cumulative water cut at Eagle Ford, Permian, Bakken and Niobrara.

FIG. 10 shows the histogram of the first 12 months measured cumulative water cut for 554 wells across our unconventional production plays. On average, Permian has the highest water cut, while Eagle Ford has the lowest.

A CNN model with similar structure to the cumulative GOR prediction model was developed for cumulative water cut prediction, with a dataset that consists of 4724 TLG oil samples collected from these 554 wells in their first 6 months of production. In this model, the predictors were the whole oil GC compositions, date the oil sample was collected, and the date the well came on-line. The prediction target was the first 12 months cumulative water cut, which was obtained from production metering. The dataset was randomly split by well with 3:1 train test split ratio for model development and test.

Figure 11:
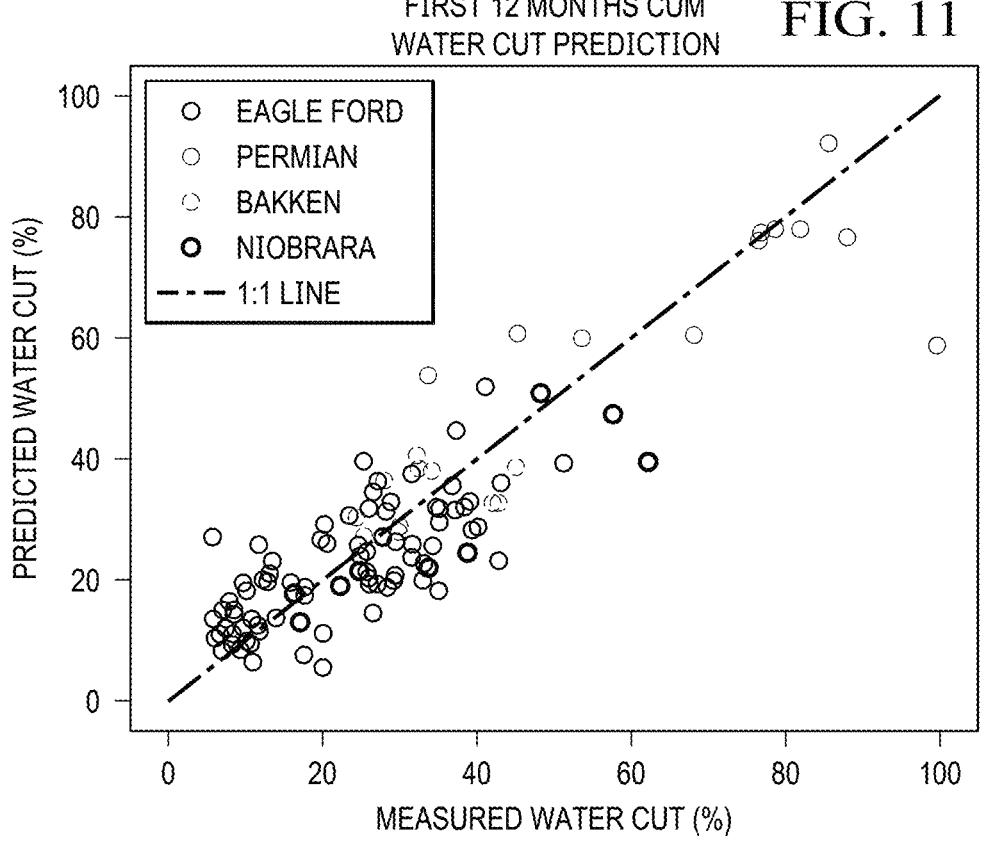
FIG. 11. Cumulative water cut prediction from CNN model test result as compared to measured water cut.

FIG. 11 shows the model test result. Even without any completion data included in the model, such as gallons of water pumped, this model was able to accurately predict the first year cumulative water cut. This result indicates that the interplay in production time scale among frac fluids, formation rock and formation fluids left overprints on the produced oil compositions, in addition to formation water related geochemical effects that occurred over geological time.

Additionally, water cut prediction is expected to improve significantly once time lapse geochemistry of produced water is incorporated into the machine learning model. Produced water TLG has not been implemented as extensively as produced hydrocarbons to date, but we expect that with the development of this technology, the practice will change to collect water data as well as oil and gas samples and data.

Prediction of Wax Risk:

Wax related flow assurance problems widely occur in nearly all unconventional productions of light oil and/or condensates. Across our Eagle Ford acreage, some wells experience wax problems and some do not, following no discernable pattern with respect to local geology or well completions. We sought herein to determine if wax deposition could be predicted using the methodology described herein.

A machine learning classification model with LogisticRegression (scikit-learn) was developed to predict the propensity for Eagle Ford production wells to experience wax problems, based on the geochemistry of the produced oils. The data set had nearly 4000 produced oil samples from 434 Eagle Ford wells in their first 6 months of production. These wells also were labelled (yes or no) for the occurrence of wax problems.

The predictors were the whole oil HRGC compositions of produced oil. The prediction target was a binary classification (yes/no) for wax problem to occur. The data set was randomly split by wells with 3:1 train test split ratio for model development and test.

Figure 12:
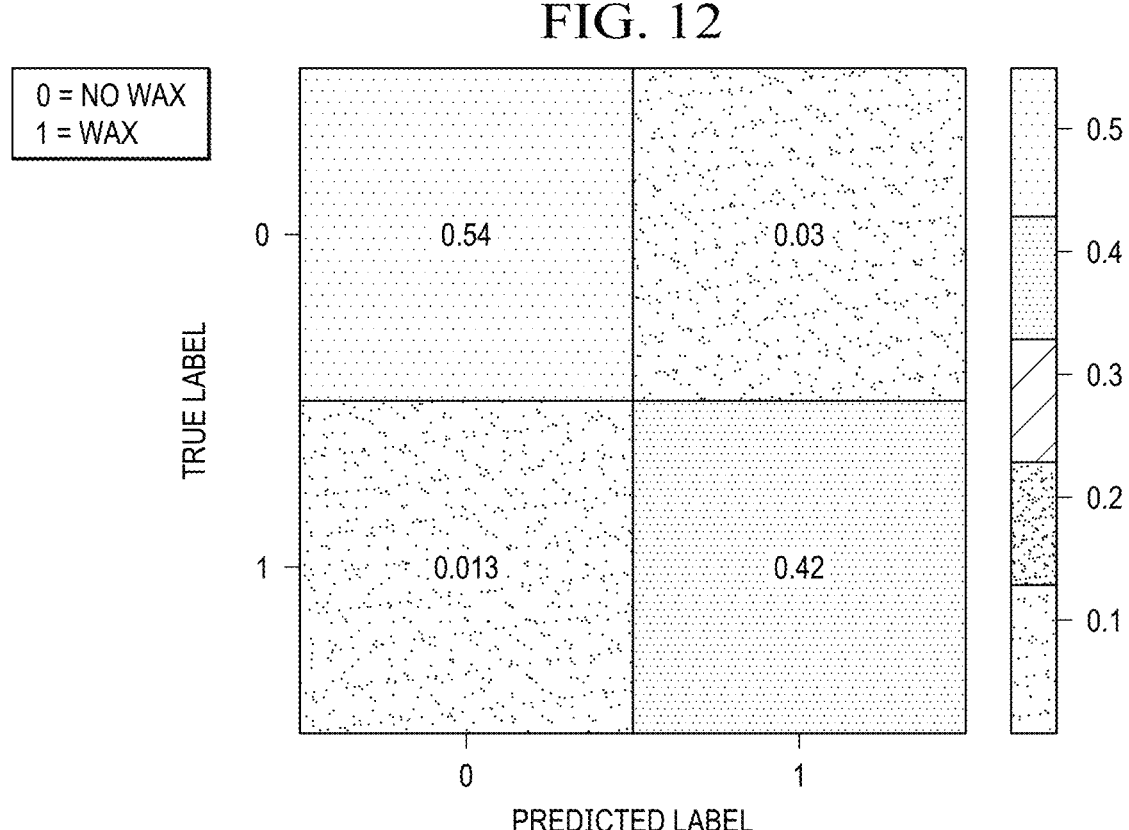
FIG. 12. Wax related flow assurance problem prediction model test result.
Figure 13:
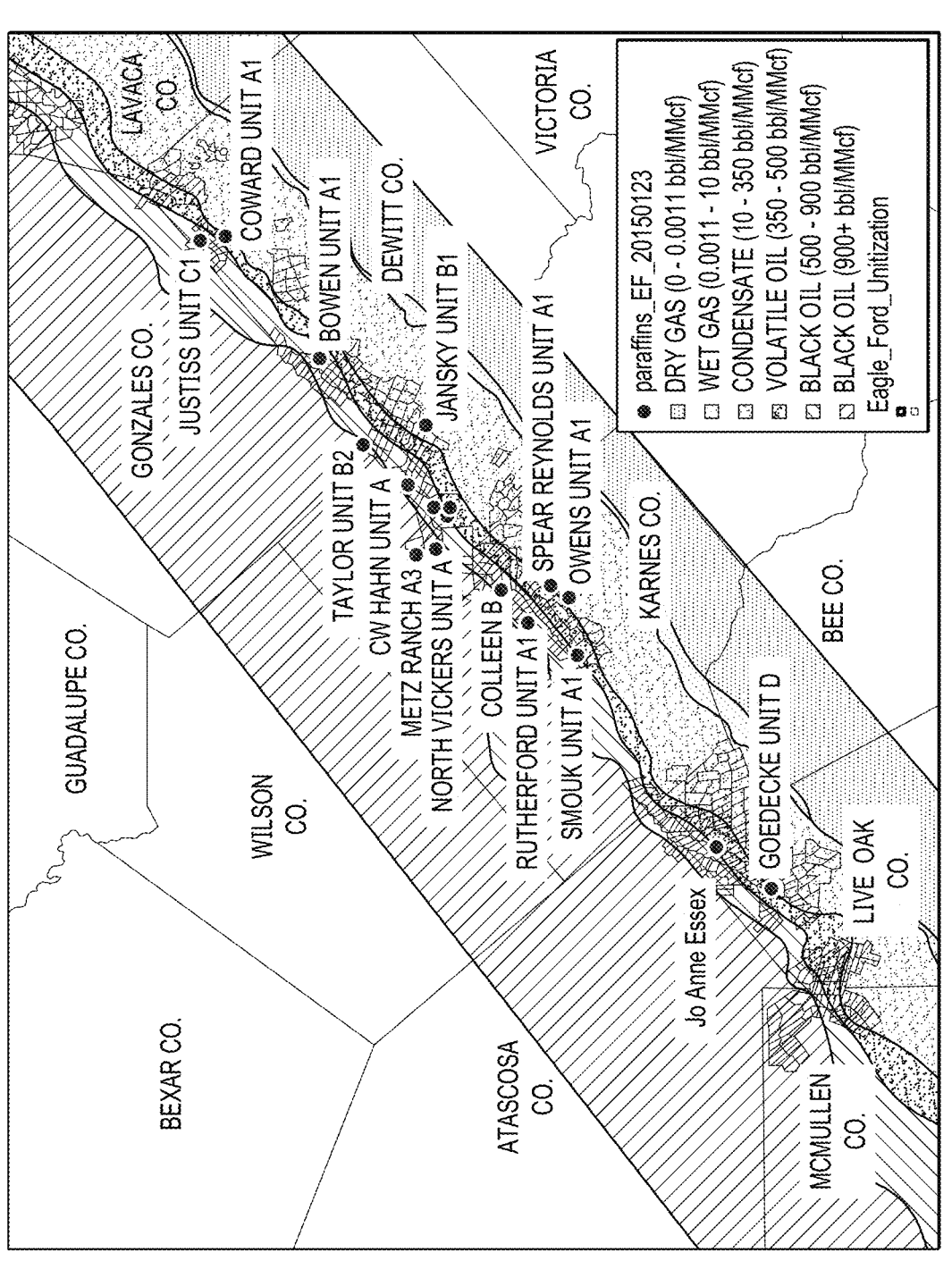
FIG. 13. Occurrence of wax problems across Conoco-Phillips Eagle Ford asset.

FIG. 12 shows the confusion matrix (a tabular summary of the number of correct and incorrect predictions made by a classifier) of tests results, in which label 0 and 1 stand for 'no' and 'yes' for the occurrence of wax problem, respectively. With this relatively simple model, the classification accuracy was over 95%, which can improve further as more production data become available. The method can be readily applied to other flow assurance problems. An ongoing effort, not reported herein, is machine learning with produced water to risk scaling formation downhole. See also FIG. 13.

Figure 14:
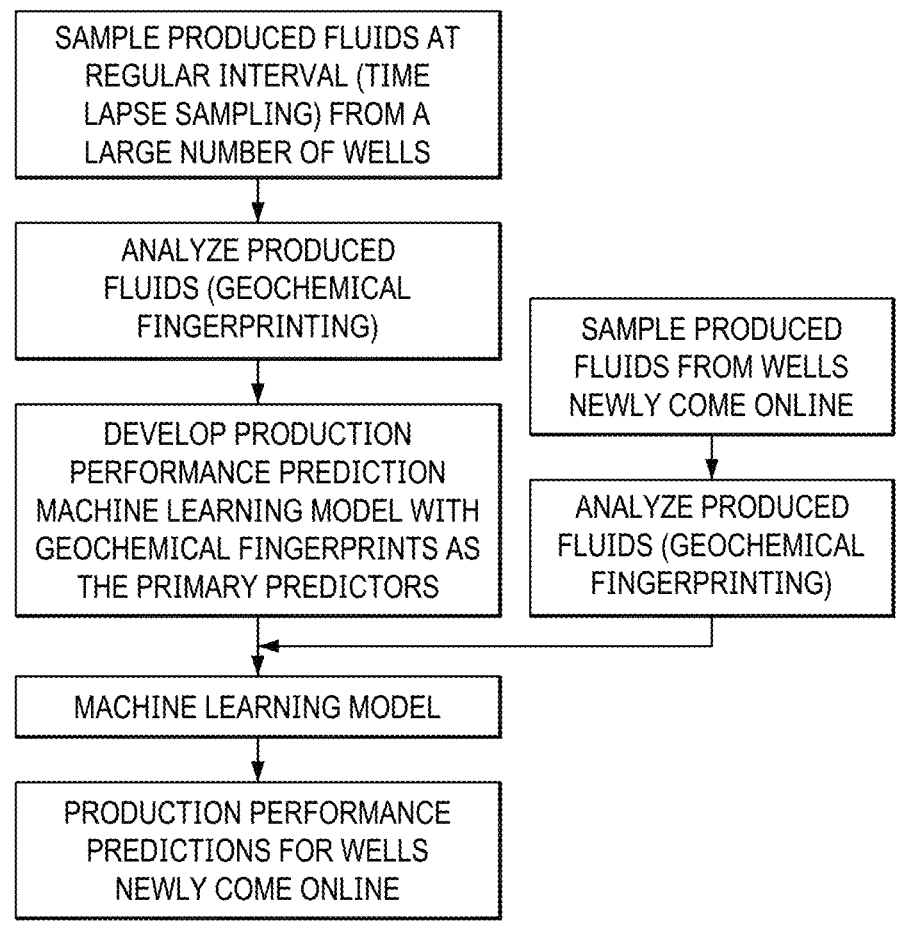
FIG. 14. Workflow diagram.

In summary, we have developed a workflow (see FIG. 14) that collects fingerprint and production data to train a machine learning model. Then with new fingerprint data from a new well or new zone, the now trained model can be used to predict production characteristics based on the new fingerprint data. Data may be stored in the manner shown in FIG. 15 or any other suitable way, and the predicters and targets can be any of those described herein or shown in FIG. 16.

This work demonstrated that all interplays among reservoir rock, reservoir fluids and completion fluids as pressure and temperature changes have geochemical imprints on produced fluids compositions, on top of typical geochemical signatures pertinent to source rock facies, maturity, and post generation alterations over geological time. Such geochemical imprints can be leveraged for production performance predictions with machine learning, particularly in the context of how such imprints change over time during the early stage of production in a large number of wells from the same play. Though subtle, these geochemical changes provide a reliable assessment of the underlying physical processes (e.g., partitioning of hydrocarbons among oil, gas, and water as pressure in well bore and nearby reservoir changes, fractionations of hydrocarbons from reservoir matrix to fractures then to well bore). Surface and downhole engineering devices have difficulty (if at all possible) to gauge such processes.

Results reported herein demonstrate the applications of machine learning with time lapse geochemistry data for production performance and flow assurance risk predictions. The predictive capabilities are expected to improve significantly, as more time lapse geochemistry data become available (as the result of systematic implementation of TLG program on more wells), as more engineering data (completion details in particular) are incorporated into the models, and as machine learning algorithms and associated implementations continue to modularize and increase in sophistication.

Hardware & Software

The present disclosure also relates to a computing apparatus for performing the operations described herein. This apparatus may be specially constructed for the required purposes of modeling, or it may comprise a general-purpose computer selectively activated or reconfigured by a spreadsheet program and reservoir simulation computer program stored in the computer. Such computer programs may be stored in a computer readable storage medium, preferably non-transitory, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

In one embodiment, the computer system or apparatus may include graphical user interface (GUI) components such as a graphics display and a keyboard, which can include a pointing device (e.g., a mouse, trackball, or the like, not shown) to enable interactive operation. The GUI components may be used both to display data and processed data and to allow the user to select among options for implementing aspects of the method or for adding information about reservoir inputs or parameters to the computer programs. The computer system may store the results of the system and methods described above on disk storage, for later use and further interpretation and analysis. Additionally, the computer system may include on or more processors for running said spreadsheet and simulation programs.

Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system.

Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors, as well as any next generation systems.

Slower systems could also be used because the processing is less computation intensive than for example, 3D seismic processing.

Reservoir simulation programs can be any known in the art, possibly modified for use herein, or any novel purpose built system. Existing commercial packages include MEERA, ECLIPSE, RESERVOIR GRAIL, 6X, VOXLER, SURFER, the CMG suite, LANDMARK NEXUS, and the like. Open source packages include BOAST—Black Oil Applied Simulation Tool (Boast), MRST—the MATLAB Reservoir Simulation Toolbox and OPM—The Open Porous Media (OPM).

The following references are incorporated by reference in their entirety for all purposes:

Abutaqiya, M. I. L., et al., (2017) Efficient algorithm for the prediction of pressure-volume-temperature properties of crude oils using the perturbed-chain statistical association fluid theory equation of state, Ind. Eng. Chem. Res. 6088-6102.

Azad, A., et al., (2017) Accelerating completions concept select in Unconventional Plays Using Diagnostics and Frac Modeling, SPE-184867-MS Baskin, D. K., et al., (2014) Allocating the contribution of oil from the Eagle Ford Formation, the Buda Formation, and Austin Chalk to Commingled Production from Horizontal Wells in South Texas Using Geochemical Fingerprinting Technology; AAPG Annual Conventional May 19-22, 2013 Search and Discovery Article #41268

Benamara, C., et al., (2019) Modeling wax disappearance temperature using advanced intelligent frameworks, Energy & Fuels 33: 10959-10968.

Bennett, B., et al., Oil Fingerprinting for Production Allocation: Exploiting the Natural Variations in Fluid Properties Encountered in Heavy Oil and Oil Sand Reservoirs, AAPG Search and Discovery Article #90163

Bowen, G. J. & Wilkinson, B., (2002). "Spatial distribution of δ18O in meteoric precipitation." Geology 30(4): 315-318.

Cander, H., (2012) Sweet Spots in shale gas and liquids plays: prediction of fluid composition and reservoir pressure, AAPG Long Beach Calif., April 22-25.

Capo, R. C., et al., (2014) The strontium isotope evolution of Marcellus Formation produced waters, southwestern Pennsylvania, 126: 57-63.

Chapman, E. C., et al., (2012) Geochemical and strontium isotope characterization of produced waters from Marcellus Shale natural gas extraction, Environmental Science and Technology 46: 3545-3553.

Cipolla, C., (2015) How do we Optimize Hydraulic Fracturing in Shale Resource Plays? Learning from the Past and Predicting the Future, Society of Petroleum Engineers.

Cipolla, C. L., et al., (2012) Engineering Guide to the Application of Microseismic Interpretations, Society of Petroleum Engineers.

Ebongue, V. W., et al., (2005) Cholorine isotope residual salt analysis: A new tool to investigate formation waters from core analyses, AAPG Bull., 89(8): 1005-1018.

England, W. A., (2002) Empirical correlations to predict gas/gas condensate phase behavior in sedimentary basins, Org. Geochemistry. 33: 665-673.

Freeman, C., et al., (2012). Measurement, Modeling, and Diagnostics of Flowing Gas Composition Changes in Shale Gas Wells, SPE-153391-MS Frost, C. D., & Toner, R. N., (2004) Strontium isotopic identification of water-rock interaction and ground water mixing, Ground Water, 42: 418-432.

Hall C., et al., (2021) Predictive capability assessment of probabilistic machine leaning models for density prediction of conventional and synthetic Jet Fuels, J. Energy Fuels, 35: 2520-2530.

Jones S. R., (2016) Producing-Gas/Oil Ratio Behavior of Multifactured Horizontal wells inTight Oil Reservoirs, SPE Res Eval & Eng 20 (03): 589-601, SPE-184397-PA Jweda J., et al., (2021) Machine-Learning Assisted Production Allocation Using a 3-D Full Field Geochemical Model of Produced Oils in the Eagle Ford and Austin Chalk of South Texas. URTeC 5117.

Jweda J., et al., (2017) Optimizing field development strategy using time-lapse geochemistry and production allocation in Eagle Ford. URTeC 2671245.

Jweda, J., et al., (2017). Optimizing field development strategy using time-lapse geochemistry in Eagle Ford, URTEC-2017-2671245.

Katritzky A., et al., (2010) Quantitative correlation of physical and chemical properties with chemical structure: Utility for Prediction, Chem. Rev. 110: 5714-5789.

Langman, J. B., (2015) Spatial distribution of δ2H and δ18O values in the hydrologic cycle of the Nile Basin, Journal of Arid Land 7(2): 133-145.

Laughland, M. M., et al., (2014) Uncharted Waters: What Can We Learn From Waters Produced From Horizontal Wells in the Permian Basin? URTEC-1926712-MS.

Long H., et al., (2020) Integrating oil and water geochemistry to assess SRV and DRV in the Bakken/Three Forks Hybrid Play. URTec 2470.

Lui F., et al., (2017) Time-lapse Geochemistry (TLG) Application in Unconventional Reservoir Development. URTeC 2670186.

McCaffrey, M. A., et al., (2011) Geochemical allocation of commingled oil production or commingled gas production. SPE 144618.

McCaffrey, M. A., et al., (2012) Oil fingerprinting dramatically reduces production allocation costs. World Oil, March 2012, p 55-59.

McCaffrey, M. A., et al., (1996) Using biomarkers to improve heavy oil reservoir management: An Example from Cymric Field, Kern County, California, AAPG Bull., 80: 898-913.

McCaffrey, M. A., et al., (2006) Reducing the Cost of Production Allocation by 95% Using a Geochemical Technique: Abstract, AAPG 2006 Annual Convention, Houston, Tex., Apr. 9-12, 2006.

Muehlenbachs, K., (1998) The oxygen isotopic composition of the oceans, sediments and the seafloor, Chemical Geology 145(3-4): 263-273.

Nouvelle et al., (2012) Novel Method of Production Back-Allocation Using Geochemical Fingerprinting SPE 160812.

Rasdi F. et al., (2012) An investigation of vertical and lateral communication in an unconventional oil reservoir using geochemistry and reservoir simulation, SPE 162673.

Ruffier-Meray, V., et al., (1998) Fractionation of hydrocarbons between oil and gas phases. Revue de l'Institut Français du Pétrole, EDP Sciences, 53(3): 379-390.

Sandvik E. I. & Mercer J. N., (1990) Primary migration by bulk hydrocarbon flow, Org. Geochem., 16: 83-89.

U.S. Pat. No. 8,818,736 Allocating oil production from geochemical fingerprints.

Van Graas G. W., et al., (2000) The effects of phase fractionation on the composition of oils, condensates and gases, Org. Geochem. 31: 1419-1439.

Whitson C. H. & Sunjerga S., (2012) PVT in Liquid-Rich Shale Reservoirs, SPE 155499.

U.S. Pat. No. 11,002,722 US2018313807 Time-series geochemistry in unconventional plays.

U.S. Pat. No. 8,360,143 Method of determining end member concentrations.

U.S. Pat. No. 8,781,747 Method of determining parameters of a layered reservoir.

U.S. Pat. No. 8,818,736 Allocating oil production from geochemical fingerprints.

U.S. Pat. No. 9,074,465 Methods for allocating commingled oil production.

What is claimed:

1. A method of optimized hydrocarbon production, comprising:

a) bringing a new hydrocarbon well online in a zone of a reservoir;

b) collecting a plurality of hydrocarbon samples from said well over a period of time using a shorter time interval at a beginning of hydrocarbon production and increasing to a longer time interval as hydrocarbon production proceeds;

c) assigning a time and location identifier to each of said plurality of samples;

d) analyzing said plurality of samples to obtain time-lapse production data, said time-lapse production data including gas to oil ratio (gas/oil volume) and water cut ratio (water/total liquid volume);

e) analyzing each of said plurality of samples to obtain time-lapse fingerprint data, said analysis including chemical composition by high resolution gas chromatography (HRGC) and isotope composition by gas chromatography isotope ratio mass spectrometry (GC-IR-MS);

f) training a machine learning model with both said time-lapse fingerprint data and said time-lapse production characteristics to obtain a predictive model;

g) predicting one or more future production characteristics from said well using said predictive model;

h) optimizing a production plan based on said predicted production characteristics;

i) implementing said optimized production plan at said well or at a new well in said zone; and j) producing hydrocarbons from said well or said new well using said optimized production plan.

2. The method of claim 1, wherein said time-lapse production data includes API oil gravity.

3. The method of claim 1, wherein said time-lapse production data includes wax deposition.

4. The method of claim 1, wherein well completion parameters are added to said reservoir model.

5. The method of claim 1, further comprising obtaining well characteristics and including said well characteristics in said training step f), wherein said well characteristics include one or more of well length, well depth, well arrangement in a plurality of wells, well fracturing, well stimulation method, and well completion type.

6. The method of claim 1, wherein the machine learning model is optimized and evaluated a plurality of times with a variety of random train test splits, until said random splits produce similar train and validation results.

7. The method of claim 1, wherein a machine learning model with support vector machine (SVM) regression model with a radial basis function kernel is used for static fluid property predictions or wherein a machine learning model with a convolution neural network (CNN) regression model is used for dynamic production performance predictions, or both.

8. The method of claim 1, wherein said machine learning model uses a regression algorithm, a linear regression algorithm, a multiple linear regression algorithm, a polynomial regression algorithm, a decision tree regression algorithm, a random forest regression algorithm or a classification algorithm.

9. The method of claim 1, wherein a machine learning model with a support vector machine (SVM) regression model with a radial basis function kernel is used for static fluid property predictions.

10. The method of claim 1, wherein a machine learning model with a convolution neural network (CNN) regression model is used for dynamic production performance predictions.

* * * * *